US006971061B2

(12) United States Patent
Sekine

(10) Patent No.: US 6,971,061 B2
(45) Date of Patent: Nov. 29, 2005

(54) INFORMATION RETRIEVAL SYSTEM AND A COMPUTER PRODUCT

(75) Inventor: Hidenori Sekine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 09/728,821

(22) Filed: Nov. 29, 2000

(65) Prior Publication Data

US 2001/0013042 A1    Aug. 9, 2001

(30) Foreign Application Priority Data

Feb. 8, 2000    (JP)    .............................. 2000-031228

(51) Int. Cl.[7] .............................................. G06F 17/00
(52) U.S. Cl. .................................. 715/513; 715/501.1
(58) Field of Search ........................... 715/500, 501.1, 715/513; 345/854, 748, 751, 760

(56) References Cited

U.S. PATENT DOCUMENTS

| | | | |
|---|---|---|---|
| 6,189,002 B1 * | 2/2001 | Roitblat .......................... | 707/1 |
| 6,289,342 B1 * | 9/2001 | Lawrence et al. ............. | 707/7 |
| 6,421,675 B1 * | 7/2002 | Ryan et al. .................. | 707/100 |
| 6,480,837 B1 * | 11/2002 | Dutta ............................. | 707/3 |
| 6,631,496 B1 * | 10/2003 | Li et al. ................... | 715/501.1 |
| 2001/0034814 A1 * | 10/2001 | Rosenzweig ................. | 711/118 |
| 2002/0000468 A1 * | 1/2002 | Bansal .................. | 235/462.15 |
| 2003/0033304 A1 * | 2/2003 | Uesaka ......................... | 707/10 |

FOREIGN PATENT DOCUMENTS

| | | |
|---|---|---|
| JP | 08-305710 | 11/1996 |
| JP | 11-039338 | 2/1999 |

* cited by examiner

Primary Examiner—William Bashore
Assistant Examiner—Gregory J. Vaughn
(74) Attorney, Agent, or Firm—Greer, Burns & Crain, Ltd.

(57) ABSTRACT

An information retrieval system comprises a storage section that stores location information about information selected by a user as a document location information database, an analyzer section that analyzes frequency of utilization of each location information in the document location information database, a retrieval information accumulating section that accumulates information in a predetermined accumulation range on an accumulation base point corresponding to location information having the frequency of utilization equal to or more than a threshold value, as a retrieval information database, and a retrieval section that retrieves required information from a retrieval information database based on a retrieval condition designated by the user.

8 Claims, 14 Drawing Sheets

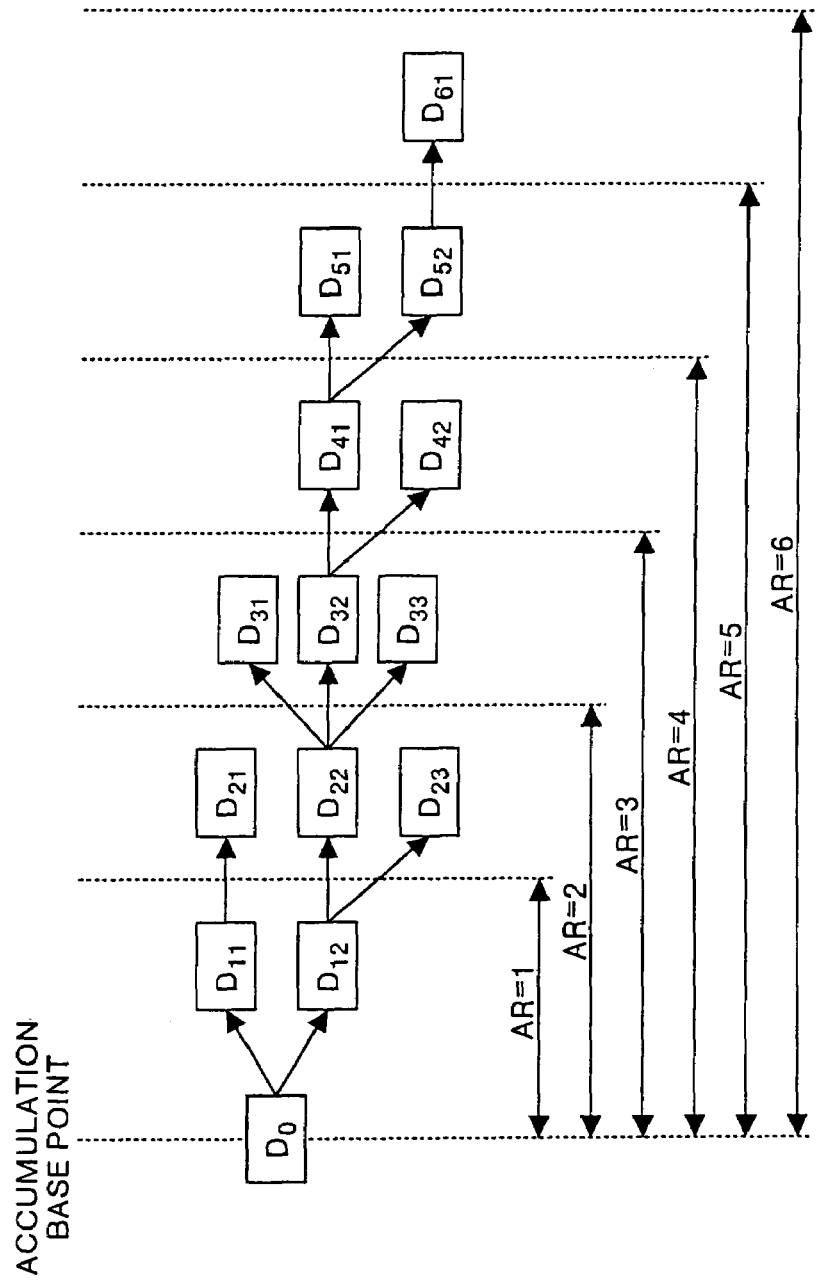

FIG. 3

| DATE | DOCUMENT LOCATION INFORMATION | 310 |
|---|---|---|
| 1999/07/12 | http://www.abcdefg.co.jp/hypertext/newinfo/ | |
| 1999/07/13 | http://www.is.abcdefg.co.jp/qa/qa1-10.html | |
| | ⋮ | |
| 1999/07/29 | http://www.is.abcdefg.co.jp/qa/qa1-10.html | |
| | ⋮ | |
| 1999/08/07 | http://www.ifos.se.abcdefg.co.jp/user/sekine/index.html | |

FIG. 4

| ACCUMULATION BASE POINT LOCATION INFORMATION | ACCUMULATION RANGE |
|---|---|
| http://www.is.abcdefg.co.jp/qa/qa1-10.html | 5 |
| http://www.abcdefg.co.jp | 5 |
| http://www.ifos.se.abcdefg.co.jp/index.html | 4 |
| ⋮ | |
| http://www.is.abcdefg.co.jp/qa/link.html | 2 |

FIG. 5

| INDEX | KEYWORD | URL | FIRST DISPLAYED INFORMATION | SECOND DISPLAYED INFORMATION |
|---|---|---|---|---|
| 1 | CHOCOA | http://www.abc | Abcdefg Ja | CHOCOA1.0 W |
| 2 | Windows | http://www.mic | MICRO | PRODUCT INFORMATION |
| | | | | |
| 10000 | CHOCOA | http://www.abc | FAQs about | CHOCOA Top |

FIG. 8

| DOCUMENT LOCATION INFORMATION | NUMBER OF TIMES OF SELECTION (TIMES) |
|---|---|
| http://www.abcdefg.co.jp/hypertext/newinfo/ | 5 |
| http://www.is.abcdefg.co.jp/qa/qa1-10.html | 20 |
| ... | |
| http://www.ifos.se.abcdefg.co.jp/user/sekine/index.html | 1 |
| http://www.pfu.co.jp/hhk | 3 |

FIG. 9

| DOCUMENT LOCATION INFORMATION | FREQUENCY (%) |
|---|---|
| http://www.abcdefg.co.jp/hypertext/newinfo/ | 10 |
| http://www.is.abcdefg.co.jp/qa/qa1-10.html | 40 |
| ... | |
| http://www.ifos.se.abcdefg.co.jp/user/sekine/index.html | 2 |
| http://www.pfu.co.jp/hhk | 6 |

FIG.10

| PRIORITY ORDER | DOCUMENT LOCATION INFORMATION | FREQUENCY (%) |
|---|---|---|
| 1 | http://www.is.abcdefg.co.jp/qa/qa1-10.html | 40 |
| 2 | http://www.abcdefg.co.jp/hypertext/newinfo/ | 10 |
| | ... | |
| 9 | http://www.pfu.co.jp/hhk | 6 |
| 10 | http://www.ifos.se.abcdefg.co.jp/user/sekine/index.html | 2 |

| PRIORITY ORDER | DOCUMENT LOCATION INFORMATION | RANGE OF RECEIVING |
|---|---|---|
| 1 | http://www.is.abcdefg.co.jp/qa/qa1-10.html | 5 |
| 2 | http://www.abcdefg.co.jp/hypertext/newinfo/ | 1 |

RETRIEVAL RESULT PAGE
FOUND 5 DOCUMENTS

1. Abcdefg Japan Homepage
   http://www.abcdefg.co.jp
   CHOCOA 1.0 WINDOWS VERSION AND FIN FIN AGENT FOR CHOCOA ARE RELEASED ...

2. CHOCOA RESOURCE CENTER
   http://www.abcdefg.co.jp/hypertext/free/chocoa/Resource Center.html
   [CHOCOA TOP PAGE] CHOCOA RESOURCE CENTER - THIS PAGE IS CHOCOA USER ...

3. CHOCOA SCRIPT FOR MACINTOSH
   http://www.abcdefg.co.jp/hypertext/free/chocoa/mac/CHOCOAScript/
   FUNCTION OF CHOCOA SCRIPT INCORPORATED IN CHOCOA 2.0 IS CHOCOA 1.0 BETA 7.1 ...

4. old News
   http://www.abcdefg.co.jp/hypertext/free/chocoa/oldnews.html
   ~ TOPICS ABOUT CHOCOA IN THE PAST - JAN. FEB. MAR. APR. MAY JUN. JUL., 1999

5. FAQs about CHOCOA
   http://www.abcdefg.co.jp/hypertext/free/chocoa/FAQ.html
   [CHOCOA TOP PAGE] CHOCOA - FREQUENTLY ASKED QUESTION READY FOR 2000 CHOCOA

KEYWORD : [ CHOCOA ]   [ RETRIEVAL ]

INFORMATION RETRIEVAL SYSTEM AND A COMPUTER PRODUCT

FIELD OF THE INVENTION

The present invention relates to an information retrieval system for retrieving information existing on the Internet, and to a computer-readable recording medium having recorded thereon a computer program for retrieving the information.

BACKGROUND OF THE INVENTION

These days the Internet is used very widely. Further, the amount of document information, for example the number of documents described with HTML (Hyper Text Markup Language), existing on the Internet has increased greatly. For retrieving desired document information from such a large amount of document information, an information retrieval system having a retrieval engine which employs keyword retrieval system is generally used. This type of information retrieval system sets one of the document information as an accumulation base point, accumulates document information linked with the document information of the accumulation base point one after another, and provides them as a database of retrieval information. When actual retrieving is performed, the system retrieves a plurality of (or a single) document information from the retrieval information database by way of the keyword system, and then the retrieved document information becomes the retrieving result.

However, a conventional information retrieval system uniformly accumulates document information started from the document information of the accumulation base point one after another, based on a definite accumulation condition (a number of links, a number of documents, a size of a document or the like). Therefore, it is difficult to obtain retrieval information associated with the retrieval result, which satisfies a large number of users, by the conventional information retrieval system. As a result, the conventional information retrieval system has a drawback of a low accuracy in retrieval, thus it is longed to provide a technique such as means and method that can solve the drawback efficiently.

Internet uses the URL (Uniform Resource Locator) as a standard to specify a means for accessing (a communication protocol) document information stored up on a server and a name of the document information. Document information means information (contents) described in HTML, for example. For instance, to specify a file of a document information stored on a server, the URL are described as [protocol name://server name/file name]. In other words, the URL is information that specifies a location where the document information exists on the Internet. Accordingly, the URL will be hereinafter referred to as a document location information.

Document information may often contain document location information of the other document information to be linked. When such a link condition between document information extends to a plurality of links, it is capable of accumulating a plurality of document information from document information as an accumulation base point, one after another. The above described conventional information retrieval system accumulates document information linked for a predetermined numbers of links (accumulation range) started from the document information of the accumulation base point one after another, based on a definite accumulation condition (a number of links or the like), and provide them as a database of retrieval information. The number of links as accumulation range is decided by a retrieval service company using the information retrieval system, without reflecting a requirement of a user.

The information retrieval system set a keyword designated by a user as a key, retrieves a plurality of (or a single) document information that contains the keyword from the database of retrieval information and obtains a retrieval result. The user browses the desired document information based on the retrieval result.

As described above, while accumulating document information on the Internet, the conventional information retrieval system accumulates document information in an accumulation range, which is uniformly determined by the retrieval service company, from the accumulation base point and performs a retrieval process based on the accumulation result.

However, the conventional information retrieval system has a drawback in that the document information out of the accumulation range, even if the requirement of the user is high, is omitted from the retrieval result as well as the accumulation result. Further, the conventional information retrieval system associates with the document information and accumulates uniformly a plurality of document information in an accumulation range in spite of utility, even if the document information corresponding to the accumulation base point is not utilized much by the user. Therefore, the conventional information retrieval system has also a drawback of containing a large amount of the useless document information in retrieval result and degrading an accuracy of retrieving. That is to say, the retrieving efficiency of the conventional information retrieval system is bad.

SUMMARY OF THE INVENTION

It is an object of the present invention to provide an information retrieval system and a computer readable recording medium having recorded thereon an information retrieving program which can improve the efficiency when retrieving documents.

The information retrieval system according to this invention comprises a storage unit that stores location information about information selected by a user as a location information database. An analyzer unit is provided for analyzing the frequency of utilization of each location information in the location information database. An accumulation unit accumulates information in a predetermined accumulation range on an accumulation base point corresponding to location information having the frequency of utilization depending on a threshold value, as a retrieval information database. Finally, a retrieval unit retrieves required information from a retrieval information database based on a retrieval condition designated by the user.

Thus, after analyzing the frequency of utilization of each location information in the location information database by the analyzer unit, the accumulation unit accumulates information in a predetermined accumulation range on an accumulation base point corresponding to location information having the frequency of utilization depending on a threshold value. The accumulated location information is the information which is frequently used by the user. When the user designates the retrieval condition, the retrieval unit retrieves required information from a retrieval information database.

Since the information retrieval system accumulates information in a predetermined accumulation range on an accumulation base point corresponding to location information having the frequency of utilization by the user depending on a threshold value and retrieves from the accumulated information, the rate of the information having the high frequency of utilization contained in the retrieval result of the system can be increased and as a result the system can improve the retrieving efficiency.

Other objects and features of this invention will become apparent from the following description with reference to the accompanying drawings.

BRIEF DESCRIPTION OF THE DRAWINGS

FIG. 2 is a schematic diagram illustrating an operation principle of the first embodiment.

FIG. 3 is a schematic diagram showing a structure of a document location information database 310 shown in FIG. 1.

FIG. 4 is a schematic diagram showing a structure of an accumulation base point location information database 330 shown in FIG. 1.

FIG. 5 is a schematic diagram showing a structure of a retrieval location information database 350 shown in FIG. 1.

FIG. 8 is a schematic diagram showing a structure of a temporally storing table $T_1$ used in the first embodiment.

FIG. 9 is a schematic diagram showing a structure of a temporally storing table $T_2$ used in the first embodiment.

FIG. 10 is a schematic diagram showing a structure of a temporally storing table $T_3$ used in the first embodiment.

FIG. 11 is a schematic diagram showing a structure of a temporally storing table $T_4$ used in the first embodiment.

FIG. 15 is a schematic diagram showing one example of a retrieval result page $G_2$ used in the first embodiment.

DESCRIPTION OF THE PREFERRED EMBODIMENTS

Two preferred embodiments of the information retrieval system and a computer readable recording medium having recorded thereon an information retrieving program of the present invention are described in detail below while referring to the attached drawings.

Figure 1:
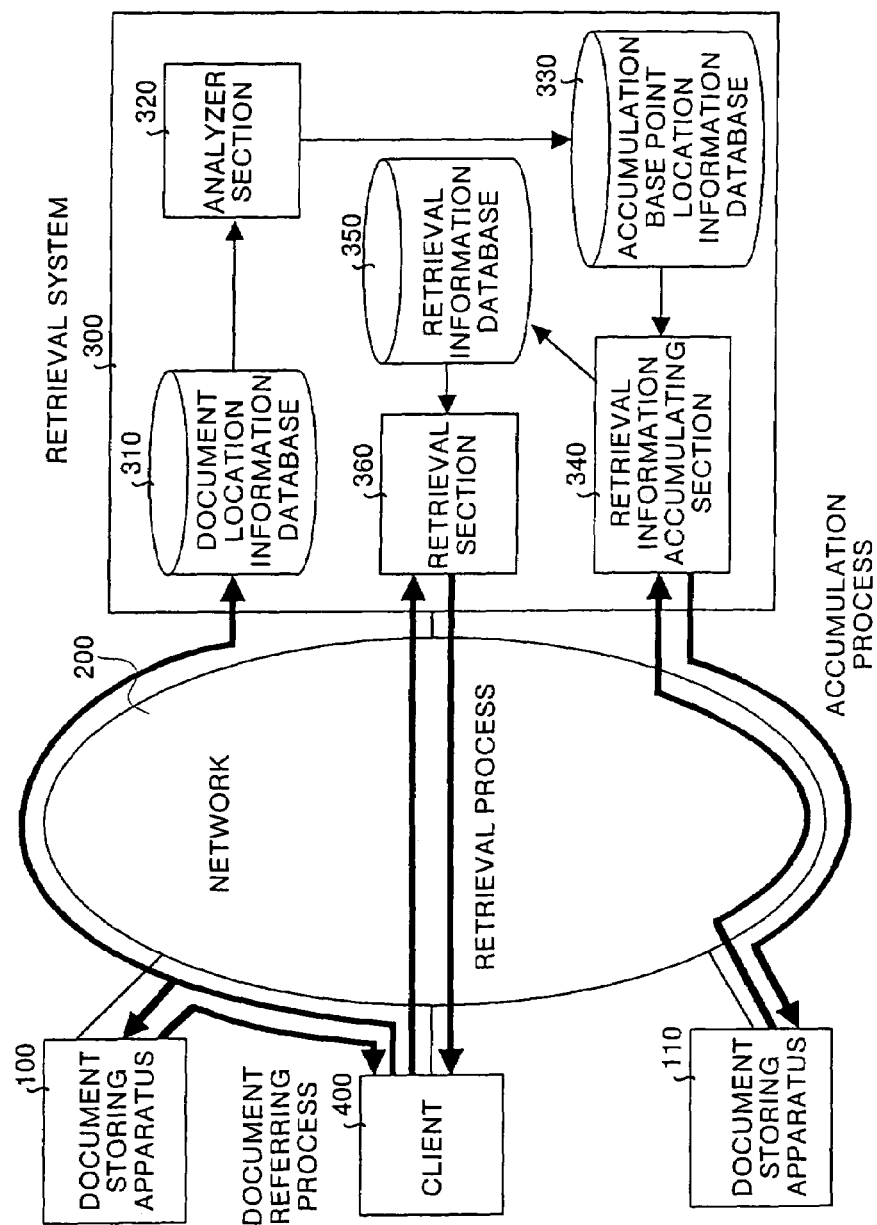
FIG. 1 is a block diagram showing a system according to a first embodiment of the present invention.

FIG. 1 is a block diagram showing a construction of an information retrieval system according to a first embodiment of the present invention. As shown in FIG. 1, a plurality (although only two are shown in this figure) of document storing apparatuses 100 and 110 each of which stores a plurality of document information, a client 400 that accesses the document information stored in the document storing apparatuses 100 and 110, and a retrieval system 300 are connected to each other through a network 200 (for example, the Internet). The document information here means, for example, the information (contents) described with the HTML. The retrieved information is not limited only to document information, but it could be any electronic information of any file formats such as JPEG format, MPEG format. The retrieval system 300 executes an accumulation process for accumulating the document information from the document storing apparatuses 100 and 110, a retrieval process based on a keyword designated by the client 400 for retrieving document information containing a keyword from the accumulated document information, and analyzer process for analyzing the requirement of the user based on a document location information corresponds to the location of the document information selected by the user from document information retrieved.

In the retrieval system 300, a document location information database 310 stores, as shown in FIG. 3, a selected date by the client 400, and document location information in storage section (not shown). An analyzer section 320 analyzes the document location information database 310 at a point of view of the user requirement and reflects the analyze result on an accumulation base point location information database 330 as shown in FIG. 4. The detail of an operation of the analyzer section 320 described later.

The accumulation base point location information database 330, shown in FIG. 4, contains accumulation base point location information and accumulation range in accumulation process. This accumulation base point, as shown in FIG. 2, is the starting point of accumulating document information by a retrieval information accumulating section 340 (see FIG. 1), and the accumulation range AR is the range in unit of a link, such as 1 link–6 links, for example. Therefore, when accumulation range AR is 1 link, the document information $D_{11}$ and $D_{12}$ which exist in the range of 1 link from the document information $D_o$ existed on accumulation base point are accumulated.

In the same manner as above, when accumulation range AR is 5 links, the document information $D_{11}$, $D_{12}$, $D_{21}$, $D_{22}$, $D_{23}$, $D_{31}$, $D_{32}$, $D_{33}$, $D_{41}$, $D_{42}$, $D_{51}$ and $D_{52}$ which exist in the range of 5 links from the document information $D_o$ are accumulated. In this case, the document information $D_{61}$ exists in the range corresponding to accumulation range AR is 6 links, is not accumulated as out of subject.

Referring back to FIG. 1, the retrieval information accumulating section 340 accumulates the document information in the accumulation range from the document storing apparatuses 100 and 110, based on the accumulation base point database 330, and stores the accumulated information in a retrieval information database 350. The retrieval information database 350 shown in FIG. 5 comprises the fields of an "index", a "keyword" corresponding to the keyword contained in that retrieval information (document information), a "URL" corresponding to the document location information associated with that retrieval information (document information), and a "first displayed information" and "second displayed information" both corresponding to a part of the text (character string) contained in that retrieval information (document information).

Referring back to FIG. 1, the retrieval section 360 retrieves the retrieval information database 350 (see FIG. 5) for the keyword (hereinafter referred to as "inputted keyword") given from the client 400 as a key, and send the document location information (the URL), the first displayed information and the second displayed information of the document information which contains a keyword in accordance with the inputted keyword, to the client 400 as a retrieval result (retrieval result page $G_2$: see FIG. 15).

Figure 6:
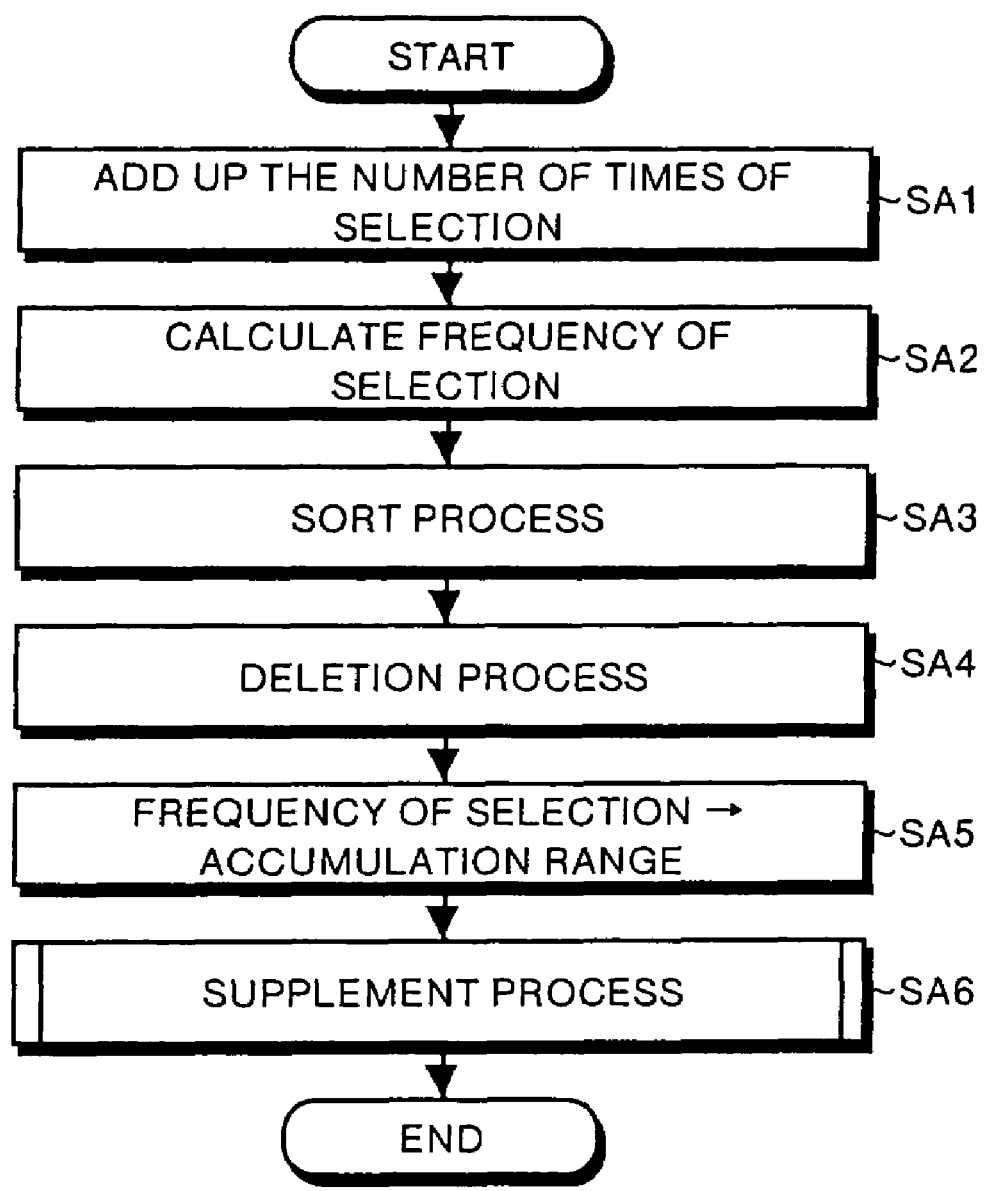
FIG. 6 is a flowchart showing an operation of an analyzer section 320 shown in FIG. 1.

Then, referring to a flowchart shown in FIG. 6 an operation of the analyzer section 320 in FIG. 1. In FIG. 1, when the retrieval process described below has been executed, the retrieval result is sent to the client 400 from the retrieval section 360. When the user selects the required document information from the retrieval result, the client 400 accesses the document storing apparatus 100 in which that document information is stored, for example, and downloads that document information.

Then the client 400 sends the selected date and the document location information corresponding to selected document information to the retrieval system 300. These date and document location information are stored in the document location information database 310 shown in FIG. 3. By repeating the above operation, the date and the document location information with reference to the document information actually selected by the user are stored in the document location information database 310 one after another.

The analyzer section 320 executed the analyzing process based on the document location information database 310 intermittently with the constant interval time. Therefore, in step SA1 shown in FIG. 6, the analyzer section 320 adds up the selected time of every document location in the document location information database 310 (see FIG. 3), and stores the added result in a temporally storing table $T_1$ shown in FIG. 8. In this temporally storing table $T_1$, for example, the document location information (www.abcdefg.co.jp/hypertext/newinfo/)) of the first records is selected 5 times by the user.

In step SA2 shown in FIG. 6, the analyzer section 320 calculates the selection frequency on every document location from the number of selection times of the temporally storing table $T_1$ and a following equation (1). This selection frequency represents a percentage of the selection times of that document location over total selection times.

Selection Frequency=((Selection Times of That Document Location)/(Total Selection Times of All Document Location))×100 (1)

Next, the analyzing section 320 stores the calculated selection frequency on each location in a temporally storing table $T_2$ shown in FIG. 9. In this temporally storing table $T_2$, for example, "frequency" (selection frequency) of the first record is 10%. In step SA3, the analyzing section 320 sorts the temporally storing table $T_2$ shown in FIG. 9, in decreasing order as a key of "frequency" (selection frequency), and thereafter numbers the priority order of each document location.

Then, the analyzing section 320 stores the result of sorting into a temporally storing table $T_3$ shown in FIG. 10. In step SA4, the analyzing section 320 delete the record (including priority order, document location information, and frequency) that has the "frequency" (selection frequency) less than a predetermined threshold level (for example, 10%), from the temporally storing table $T_3$ shown in FIG. 10. Where, the threshold level is derived from a following equation (2).

Threshold Level=((Maximum Value of Selection Frequency)+(Minimum Value of Selection Frequency))/2 (2)

In the example shown in FIG. 10, from the third record through the tenth record are deleted. The user's requirement of this deleted records is very low. In other words, the deleted records are corresponding to the document location information with reference to the document information, which hardly utilizes. In step SA5, the analyzing section 320 derives the accumulation range from the selection frequency based on the following equation (3), and then stores the derived accumulation range in the temporally storing table $T_4$ shown in FIG. 11.

Accumulation Range=(Selection Frequency of That Document Location/Maximum Value of Selection Frequency)×Maximum Value of Accumulation Range (3)

Where the fractions of the result of equation (3) is raised to a unit. The accumulation range of the first record in FIG. 11 is 5 (accumulation range AR=5: see FIG. 2), and the accumulation range of the second record is 1 (accumulation range AR=1: see FIG. 2).

Figure 7:
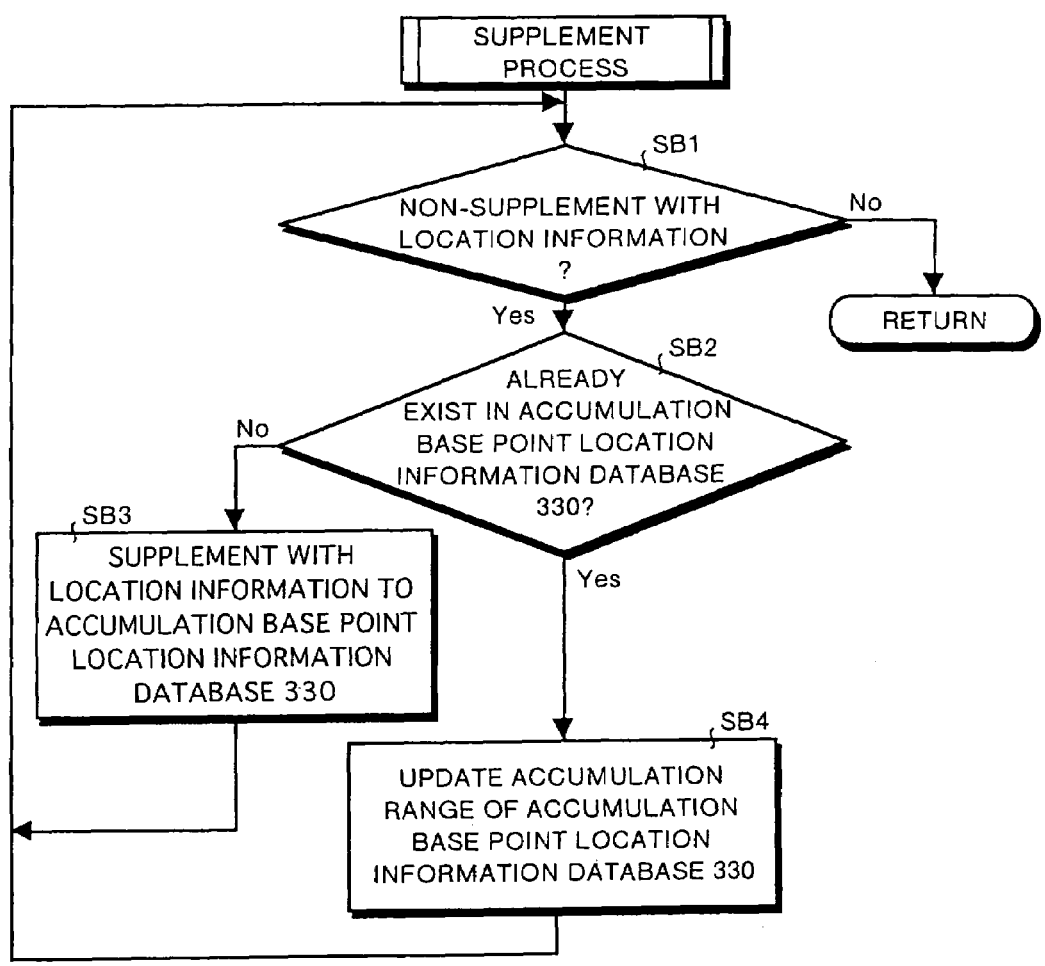
FIG. 7 is a flowchart showing a supplement process shown in FIG. 6.

In step SA6, the analyzing section 320 executes a supplement process in which the analyzing section 320 supplement the accumulation base point location information database 330 as shown in FIG. 4, with the information (document location information, accumulation range) of the temporally storing table $T_4$. Therefore, in step SB1 shown in FIG. 7, the analyzing section 320 determines whether the document location information that has not been supplement yet, i.e., that must be supplemented, is exist in the temporally storing table $T_4$, or not. In this case, it is assumed that the result of the determination is "Yes".

In step SB2, the analyzing section 320 determines whether the document location information, yet supplemented, in the temporally storing table $T_4$ has already existed on "the accumulation base point location information" in the accumulation base point location information database 330. If the result of the determination is "Yes", in step SB4, the analyzing section 320 updates the accumulation range in the accumulation base point location information database 330 to the accumulation range as shown in FIG. 11.

On the other hand, if the result of the determination on step SB2 is "No" in step SB3, the analyzing section 320 supplements the accumulation base point location. information database 330 with the document location information shown in FIG. 11 as the "the accumulation base point location information" shown in FIG. 4. Thereafter, in the steps follows to the step SB1, the operation above described is repeated. When the supplement process have completed, the analyzing section 320 makes the result of the determination of step SB1 "No", and terminates a sequence of the analyzing process.

Figure 12:
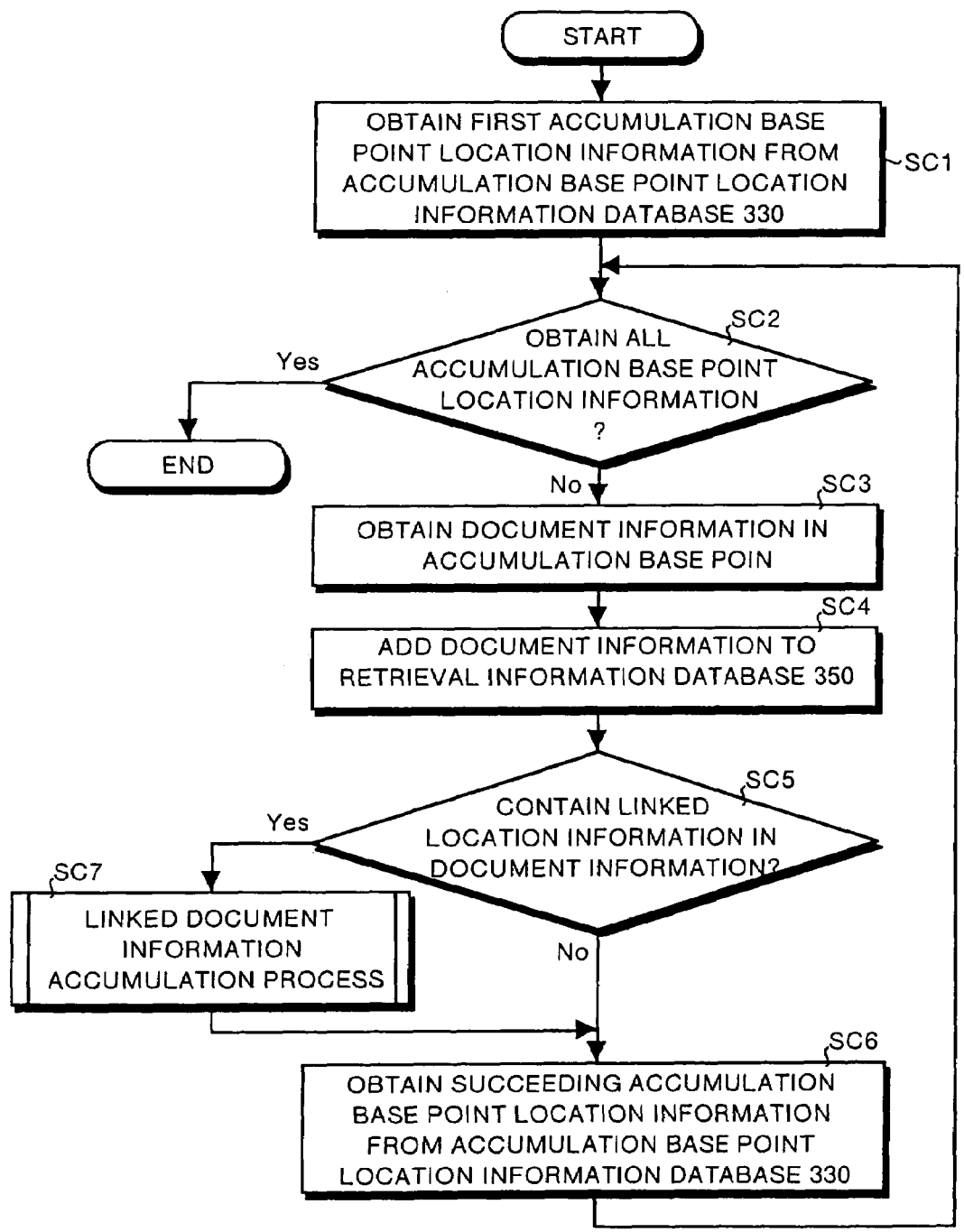
FIG. 12 is a flowchart showing an operation of a retrieval information accumulating section 340 shown in FIG. 1.
Figure 13:
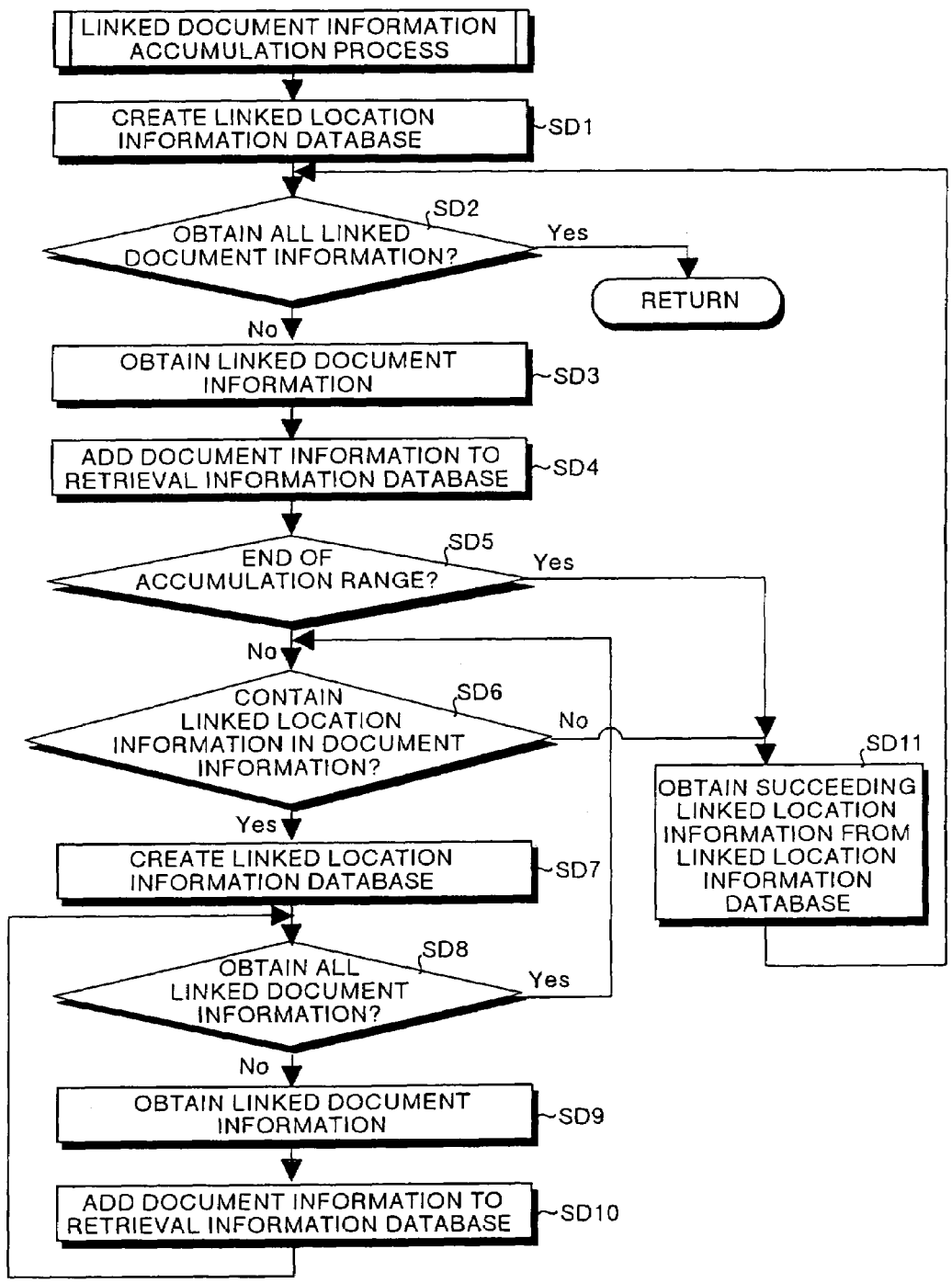
FIG. 13 is a flowchart showing a linked document information accumulation process shown in FIG. 12.

Next, referring to flowcharts shown in FIGS. 12 and 13, an operation of the retrieval information accumulating section 340 shown in FIG. 1 is described. In step SC1 shown in FIG. 12, the retrieval information accumulating section 340 obtains a first accumulation base point (in this case, www.is.abcdefg.co.jp/qa/qa1-10..html) on the accumulation base point location information database 330 (see FIG. 4). In step SC2, the retrieval information accumulating section 340 determines whether all of the accumulation base point location information have been obtained from the accumulation base point location information database 330, or not. If the result of the detenrination is "Yes", the retrieval information accumulating section 340 terminates the process.

In this case, it is assumed that the result of the determination on step SC2 is "No", in step SC3, the retrieval information accumulating section 340 obtains the document information $D_o$ exist on the accumulation base point shown in FIG. 2 from the document storing apparatus 110 by way of the network 200 based on the accumulation base point location information obtained on step SC2. In step SC4, the retrieval information accumulating section 340 supplements the retrieval information database 350 (see FIG. 5) with the keyword, the URL, the first displayed information and the second displayed information in the obtained document information $D_o$.

Figure 16:
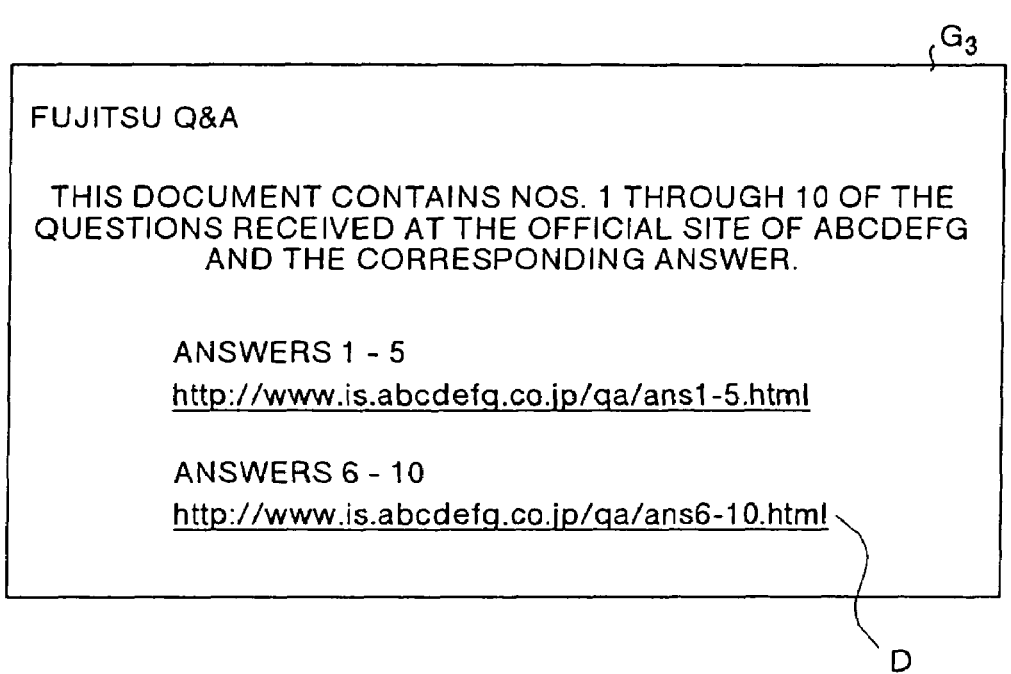
FIG. 16 is a schematic diagram showing one example of a document page $G_3$ used in the first embodiment.

In step SC5, the retrieval information accumulating section 340 determines whether the document information $D_o$ contains linked document location information or not. In this case, as shown in FIG. 2, it is resumed that the document information $D_o$ contains the document location information with reference to the linked document information $D_{11}$ and $D_{12}$. For example, in FIG. 16, the document page $G_3$ is shown in case where the document information $D_o$ is displayed on display section (not shown) of the client 400. In the display area D of the document page $G_3$, the document location information of linked document information $D_{11}$ and $D_{12}$ of the document information $D_o$, as well as the document information $D_o$.

Therefore, the retrieval information accumulating section 340 makes the result of the determination on step SC5 "Yes", and executes the process of step SC7. If the result of the determination on step SC5 is "No", in step SC6, the retrieval information accumulating section 340 obtains the next accumulation base point location information in the accumulation base point location information database 330 (see FIG. 4). Thereafter, the operation following to step SC2 is repeated.

In this case, in step SC7, the retrieval information accumulating section 340 executes a linked document information accumulation process for accumulating the linked document information. Therefore, in step SD1 shown in FIG. 13, the retrieval information accumulating section 340 creates a linked location information database. In this case, the linked location information database comprises linked document location information (the document location information of the document information $D_{11}$ and the document location information of the document information $D_{12}$) contained in the document information $D_o$ shown in FIG. 2.

In step SD2, the retrieval information accumulating section 340 determines whether the all linked document information have been obtained or not. The term of the all linked document information means the document information exist in the accumulation range 5 (FIG. 2: accumulation range AR=5) of first record shown in FIG. 4. In this case, the retrieval information accumulating section 340 makes the result of the determination "No", and in step SD3, the retrieval information accumulating section 340 obtains the document information $D_{11}$ (see FIG. 2) corresponding to the first linked information in the linked location information database from the document storing apparatus 110.

In step SD4, the retrieval information accumulating section 340 supplements the retrieval information database 350 with the obtained document information $D_{11}$. In step SD5, the retrieval information accumulating section 340 determined whether it is the end of the accumulation range or not. If the result of the determination is "Yes", the retrieval information accumulating section 340 executes the process of step SD11. In this case, the retrieval information accumulating section 340 makes the result of the determination on step SD5 "No".

In step SD6, the retrieval information accumulating section 340 determines whether the document information $D_{11}$ contains the linked document location information or not. In this case, as shown in FIG. 2, it is assumed that the document information $D_{11}$ contains the document location information associated with the linked document information $D_{21}$. Therefore, the retrieval information accumulating section 340 makes the result of the determination on step SD6 "Yes". If the result of the determination on step SD6 "No", in step SD11, the retrieval information accumulating section 340 obtains the next linked document location information from the linked location information database, and repeats the process after step SD2.

In this case, in step SD7, the retrieval information accumulating section 340 creates the linked location information database. In this case, the linked location information database comprises the document location information (the document location information of the document information $D_{21}$) as the link target contained in document information $D_{11}$ shown in FIG. 2. In step SD8, the retrieval information accumulating section 340 determined whether the all linked document information have been obtained or not. In this case, the retrieval information accumulating section 340 makes the result of the determination "No". If this result of the determination is "Yes", the retrieval information accumulating section 340 repeats the process follows to step SD6.

In this case, in step SD9, the retrieval information accumulating section 340 obtains the linked document information $D_{21}$ from the document storing apparatus 110. In step SD10, the retrieval information accumulating section 340 supplements the retrieval information database 350 with the obtained document information $D_{21}$. Thereafter, by repeating above described operation, a plurality of document exist on accumulation range AR=5 from the accumulation base point shown in FIG. 2 are obtained and supplemented with the retrieval information database 350 on after another.

When the result of the determination on step SD2 becomes "Yes", the retrieval information accumulating section 340 executes the process of step SC6 shown in FIG. 12. When the result of the determination on step SC2 becomes "Yes", the retrieval information accumulating section 340 terminates a sequence of the accumulation process. In this situation, only the document information, which has high frequency of utilization by the user, is stored in the retrieval information database 350.

Figure 14:
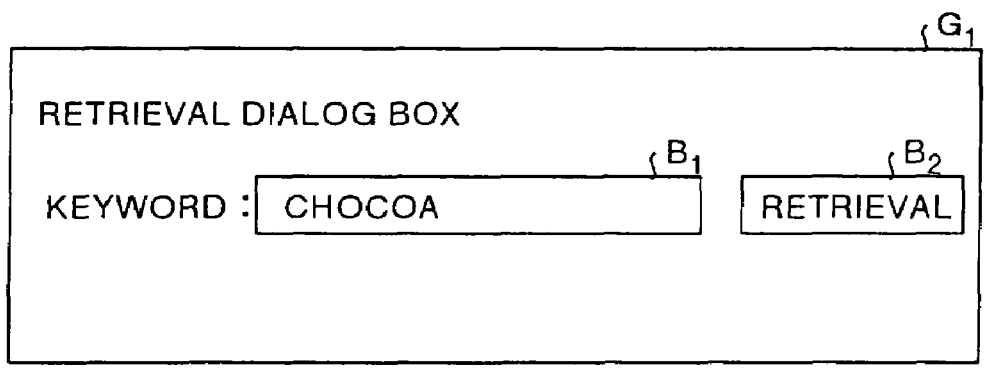
FIG. 14 is a schematic diagram showing one example of a retrieval dialog box $G_1$ used in the first embodiment.

Then the operation of the retrieval process of the retrieval section 360 is described. When a retrieval dialog box $G_1$ shown in FIG. 14 is displayed on the display section (not shown) of the client 400 shown in FIG. 1, the user inputs a input keyword (in this case "CHOCOA") as retrieval key in a keyword input box $B_1$ using a input section (not shown), and then presses a retrieval button $B_2$.

Thus, the input keyword ("CHOCOA") is sent from the client 400 to the retrieval section 360 by way of the network 200. When the input keyword ("CHOCOA") is received by the retrieval section 360, the retrieval section 360 retrieves for the input keyword ("CHOCOA") as the retrieval key in the retrieval information database 350, shown in FIG. 5, in unit of a record, and extracts the record which has a "keyword" in accordance with the input keyword ("CHOCOA"). Then, the retrieval section 360 stores the extracted record as the retrieval result in buffer (not shown).

After the retrieval is terminated, the retrieval section 360 send the retrieval result stored in the buffer to the client 400 by way of the network 200. The retrieval result is then received by the client 400, and a retrieval result page $G_2$ shown in FIG. 15 is displayed on the display section (not shown) of the client 400. This retrieval result page $G_2$ displays 5 documents with titles, document location information (URL) and a portion of a text for the input keyword ("CHOCOA").

Then, the user designates the desired one document from the 5 documents on the retrieval result page $G_2$. Thus the client 400 obtains the corresponding document information from the document storing apparatus 100, for example, and sends the document location information corresponding to the document information to retrieval system 300. This document location information is stored in the document location information database 310, as the same operation described above.

As described hereinbefore, according to the first embodiment of the present invention, since the information retrieval system accumulates information in a predetermined accumulation range on an accumulation base point corresponding to location information having the frequency of utilization the same as or more than a threshold value and retrieves from the accumulated information, the rate of the information having the high frequency of utilization contained in the retrieval result of the system can be increased and as a result the system can improve the retrieving efficiency for retrieving information.

Figure 17:
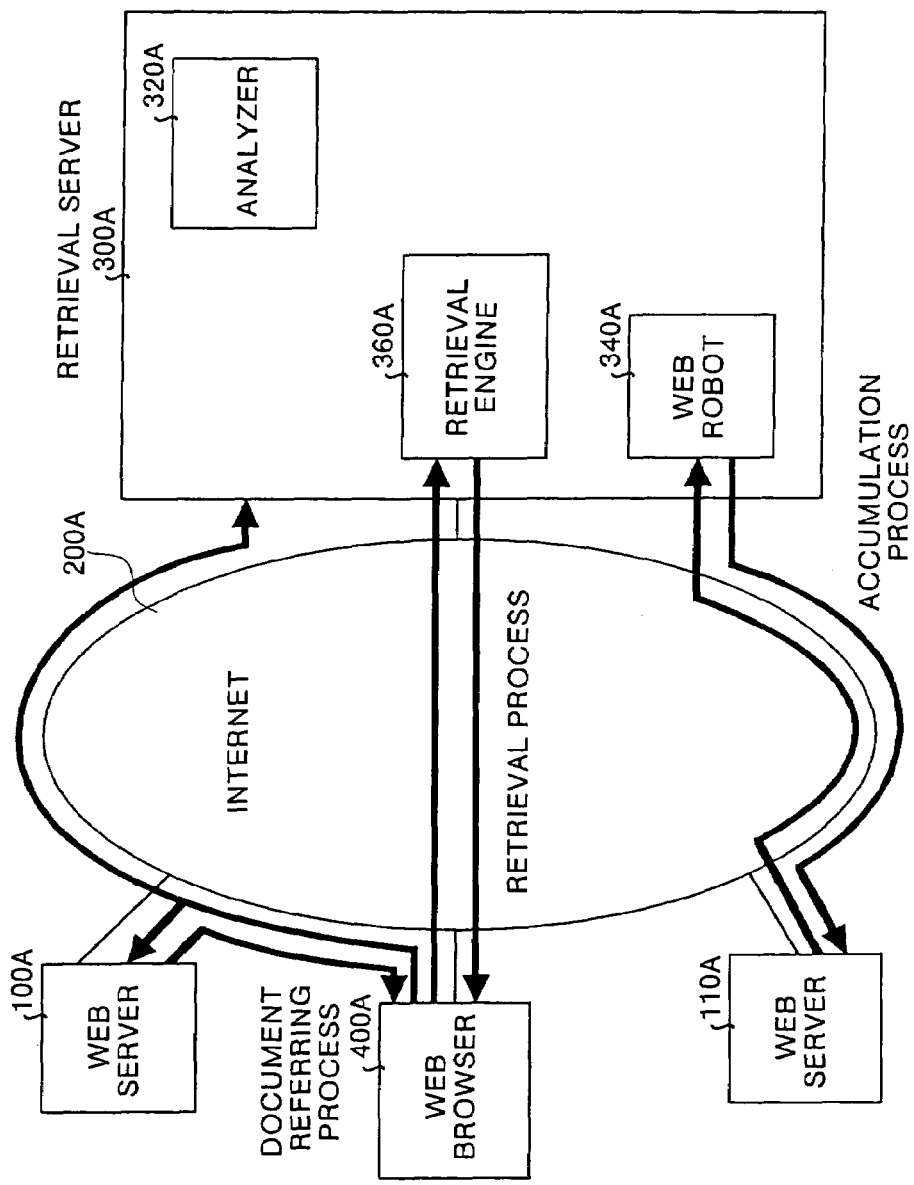
FIG. 17 is a block diagram showing a system according to a second embodiment of the present invention.

The first embodiment above described may employ the construction shown in FIG. 17. Hereinafter, referring to FIG. 17, the information retrieval system of this construction is described as a second embodiment. A WEB server 100A, a WEB server 110A, the Internet 200A, a retrieval server 300A and a WEB browser 400A shown in FIG. 17 correspond to the document storing apparatus 100, the document storing apparatus 110, the network 200, the retrieval system 300 and the client 400 shown in FIG. 1, respectively. In the retrieval server 300A shown in FIG. 17, an analyzer 320A, a WEB robot 340A and a retrieval engine 360A also correspond to the analyzer section 320, the retrieval information accumulating section 340 and the retrieval section 360 shown in FIG. 1.

Hereinbefore, the first and second embodiments of the present invention is described with referring the accompanying drawings, the actual construction of the present is not limited to these first and second embodiments, and the change and modification without departing from the spirit and scope of the present invention may be made included in the present invention.

For example, in the above described embodiment, an information retrieving program for achieving the function to retrieve a document information is recorded on a computer readable recording medium, the program recorded on the recording medium is readout and executed by the computer the retrieval may be performed. The recording medium includes a transmitting medium such as a network which stores data temporally, as well as a portable and removable recording medium such as an optical disc, floppy disk, hard disk or the like.

As described above, according to the present invention, since the information retrieval system accumulates information in a predetermined accumulation range on an accumulation base point corresponding to location information having the frequency of utilization depending on a threshold value and retrieves from the accumulated information, the system provide the effect that the rate of the information having the high frequency of utilization contained in the retrieval result of the system can be increased and as a result the system can improve the retrieving efficiency for retrieving information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information retrieval system for retrieving a plurality of information existing on a network, said information retrieval system comprising:
   a storage unit which stores location information about information selected by a user as a location information database;
   an analyzer unit which analyzes frequency of utilization of each location information in the location information database;
   an accumulation unit which accumulates information in a predetermined accumulation range on an accumulation base point corresponding to location information having the frequency of utilization depending on a threshold value, as a retrieval information database, wherein the predetermined accumulation range is a number of links linked one after another to be retrieved and the threshold value is an average of a maximum value and a minimum value for the frequency of utilization; and
   a retrieval unit which retrieves required information from the retrieval information database based on a retrieval condition designated by the user.

2. The information retrieval system according to claim 1, wherein said analyzer unit calculates the accumulation range corresponding to the frequency of utilization for each location information.

3. An information retrieval system according to claim 2, wherein said analyzer unit arranges an accumulation base point location information database which contains a calculated accumulation range and a location information corresponding to the accumulation range and being an accumulation base point, and
   said accumulation unit accumulates, as a retrieval information database, information in a predetermined accumulation range on an accumulation base point corresponding to location information having the frequency of utilization depending on a threshold value, based on the accumulation base point location information database.

4. An information retrieval system according to claim 1, wherein said analyzer unit calculates the accumulation range, which is graded, corresponding to the frequency of utilization for each location information.

5. An information retrieval system according to claim 4, wherein said analyzer unit arranges an accumulation base point location information database which contains a calculated accumulation range and a location information corresponding to the accumulation range and being an accumulation base point, and
   said accumulation unit accumulates, as a retrieval information database, information in a predetermined accumulation range on an accumulation base point corresponding to location information having the frequency of utilization depending on a threshold value, based on the accumulation base point location information database.

6. An information retrieval system according to claim 1, wherein the frequency of utilization is a percentage of a number of selection times for a document location over a total number of selection times for all document locations.

7. A computer readable medium for storing instructions, which when executed by a computer, causes the computer to perform the steps of:
   storing location information about information selected by a user as a location information database;
   analyzing frequency of utilization of each location information in the location information database;

accumulating information in a predetermined accumulation range on an accumulation base point corresponding to location information having the frequency of utilization depending on a threshold value, as a retrieval information database, wherein the predetermined accumulation range is a number of links linked one after another to be retrieved and the threshold value is an average of a maximum value and a minimum value for the frequency of utilization; and retrieving required information from the retrieval information database based on a retrieval condition designated by the user.

8. An information retrieval system according to claim 1, wherein the predetermined accumulation range is a product of the frequency of utilization and a maximum value of the predetermined accumulation range.

* * * * *